United States Patent

Benkner et al.

[11] Patent Number: 6,023,623
[45] Date of Patent: Feb. 8, 2000

[54] PROCESS FOR DYNAMIC CHANNEL ALLOCATION IN MOBILE RADIO NETWORKS

[75] Inventors: Thorsten Benkner, Hilchenbach; Klaus David; Michael Schönborn, both of Münster, all of Germany

[73] Assignee: Detemobil Deutsche Telekom Mobilnet GmbH, Germany

[21] Appl. No.: 08/894,298
[22] PCT Filed: Feb. 1, 1996
[86] PCT No.: PCT/DE96/00143
§ 371 Date: Oct. 17, 1997
§ 102(e) Date: Oct. 17, 1997
[87] PCT Pub. No.: WO96/25829
PCT Pub. Date: Aug. 22, 1996

[30] Foreign Application Priority Data

Feb. 16, 1995 [DE] Germany ............ 195 05 243

[51] Int. Cl.[7] ............................................. H04Q 7/20
[52] U.S. Cl. ..................... 455/452; 455/453; 455/62
[58] Field of Search ................................. 455/450, 451, 455/452, 453, 62

[56] References Cited

U.S. PATENT DOCUMENTS

| | | | |
|---|---|---|---|
| 5,448,750 | 9/1995 | Ericsson et al. | 455/452 |
| 5,448,761 | 9/1995 | Ushirokawa | 455/452 X |
| 5,457,711 | 10/1995 | Kellermann | 375/347 |
| 5,491,837 | 2/1996 | Haartsen | 455/450 X |
| 5,507,034 | 4/1996 | Bodin et al. | 455/452 |
| 5,594,760 | 1/1997 | Guillaud et al. | 455/245.1 |
| 5,787,358 | 7/1998 | Takahashi | 455/450 |

OTHER PUBLICATIONS

Y. Furuya and Y. Akaiwa, "Channel Segregation, A Distributed Adaptive Channel Allocation Scheme for Mobile Communication Systems, " *IEICE Transactions*, vol. E 74, No. 6; pp. 1531–1537 (Jun. 1991).

Y. Akaiwa and H. Andoh, "Channel Segregation—A Self–Organized Dynamic Channel Allocation Method: Application to TDMA/FDMA Microcellular System," *IEEE Journal on Selected Areas in Communications*, vol. 11, No. 6, pp. 949–954 (Aug. 1993).

K. Hamabe, T. Ueda, T. Otsu, "Distributed Adaptive Channel Allocation Scheme with Variable C/I Threshold in Cellular Systems," IEEE Vehicular Technology Conference, pp. 164–167 (May 1993).

*Primary Examiner*—Wellington Chin
*Assistant Examiner*—Yemane Woldetatios
*Attorney, Agent, or Firm*—Baker & Maxham

[57] ABSTRACT

A process for dynamic channel allocation in mobile radio networks, wherein priorities which are increased or decreased in dependence on interference occurring in the channel concerned are established for the individual channels. When the propagation conditions are satisfactory, channels with low priority can be allocated. The mean of values dependent on the extent of interference can be formed in order to increase and decrease the priority. In addition, various priority lists can be established for various interference or load situations, or both.

5 Claims, 2 Drawing Sheets

PROCESS FOR DYNAMIC CHANNEL ALLOCATION IN MOBILE RADIO NETWORKS

BACKGROUND OF THE INVENTION

1. Field of the Invention

This invention concerns a process for dynamic channel allocation in mobile radio networks, where priorities are established for the individual channels and are increased or reduced as a function of the interference occurring in the respective channel.

2. Discussion of the Prior Art

In mobile radio networks, transmissions between base stations and mobile stations go over channels that are established by at least one time slot on at least one carrier. In the case of a line-oriented transmission, one of the available channels must be allocated in establishing a connection and in changing from one base station to another. In the case of a package-oriented transmission, a channel must be allocated for each cohesive segment of the link.

Various types of interference that impair the transmission quality can occur in the channels. In addition to interference due to neighboring cells having the same frequencies, interference due to other interference sources can also occur, such as ignition sparks of motor vehicles, atmospheric interference and thermal noise at a low reception field strength. This interference is subject to fluctuations over time that should be taken into account in the channel allocation.

A self-adaptive, learning method of dynamic channel allocation is described by Y. Furuya and Y. Akaiwa, "Channel Segregation, A Distributed Adaptive Channel Allocation Scheme for Mobile Communication Systems," *IEICE Transactions*, vol. E 74, no. 6, pages 1531 ff. (June 1991), and by Y. Akaiwa and H. Andoh, "Channel Segregation, A Self-Organized Dynamic Channel Allocation Method: Application to TDMA/FDMA Microcellular Systems," *IEEE Journal on Selected Areas in Communications*, vol. 11, no. 6, pages 949 ff. (August 1993). The algorithm used there is called "Channel Segregation" (CSEG). The known method can be used with package-oriented transmission as well as line-oriented transmission. Each base station maintains a list of priorities for all channels available to it. After each cohesive segment of the link, the list of priorities is incremented if there was no interference in the transmission or is decremented if there was interference. Each time a new channel is allocated, the free channel with the highest priority at the moment is always the one allocated.

Then over a period of time, a pattern of usage develops in the network, where the channels with a high priority are allocated more and more frequently and those with a lower priority are allocated less and less frequently. This pattern of usage is just as static as the so-called Fixed Channel Allocation (FCA), where the available frequency resources are distributed uniformly over a repeating cell structure. This process thus guarantees that the channels will interfere with each other as little as possible with a uniform radio traffic volume. However, this is extremely inefficient when the traffic distribution is not uniform.

An improved method of dynamic channel allocation, based on the algorithm of "Channel Segregation" described above, is described by K. Hamabe, T. Ueda, T. Otsu, "Distributed Adaptive Channel Allocation Scheme with Variable C/I Threshold in Cellular Systems," 43$^{rd}$ *IEEE Vehicular Technology Conference*, Meadowlands Hilton, Secaucus, N.J., USA (May 1993). To achieve a more uniform channel allocation, a threshold value is established for the carrier/interference ratio (C/I) and is set lower for channels with a low priority than for channels with a high priority. To do so, the available channels are subdivided into three groups according to priority, where a threshold value is assigned to each group.

This process ensures a more uniform utilization of the capacity of the channels, but it does not react optimally to changes, for example, a change in traffic conditions.

SUMMARY OF THE INVENTION

A primary purpose of the present invention is to provide a process for channel allocation in mobile radio networks that also learns from the channel allocation in the past but permits a high utilization of the available channels in different traffic situations and reacts as flexibly as possible to changes.

This purpose is achieved with a process according to this invention due to the fact that channels with a lower priority are occupied under good propagation conditions. With this process according to the present invention, channels with a lower priority are occupied more often than with the known process. Therefore, the efficiency of the network is improved significantly. Furthermore, there is a greater possibility for the initially low priority of a channel to be raised under appropriate conditions.

In this process, a threshold value, in particular the carrier/interference ratio, that is used in testing whether a channel is to be occupied or not, is preferably a function of the priority of the respective channel. This permits an advantageous method of taking into account the propagation conditions in the allocation of channels. The function will preferably follow a course which starts from a constant value, decreases monotonically as the priority becomes lower, and is preferably logarithmic.

The weighting of the propagation conditions and the interference can be accomplished by various measurements, for example, of the carrier/interference ratio, the received field strength, in mobile radio networks with output regulation of the required manipulated variable and optionally also the signal propagation time. Rapid adaptation of the priorities can be accomplished in another process according to this invention due to the fact that to increase and decrease the priority, a quantity that depends on the extent of the interference is averaged, preferably by recursive filtering.

Another process according to this invention serves to make channel allocation dynamic due to the fact that different priorities are assigned to the channels under different interference or load situations, or both, where the priorities of all channels for a given interference situation and/or load situation are carried in a priority list, and when the channels are occupied, the priority to be used is taken from the priority list for the given interference situation and/or load situation. According to the prevailing situation, the priority list adapted to this situation is used for channel allocation. Therefore, the reaction time is reduced to the recognition of the respective situation or preprogrammed switching from one priority list to another.

The priority list can be selected over an entire network or in individual regions within the network, independently of each other. When several base stations are combined into such regions, it is important to minimize the mutual influence of the boundary cells of the individual regions.

BRIEF DESCRIPTION OF THE DRAWING

The objects, advantages, and features of the invention will be more readily perceived from the following detailed description, when read in conjunction with accompanying drawing, in which.

DETAILED DESCRIPTION OF THE PREFERRED EMBODIMENTS

Figure 1:
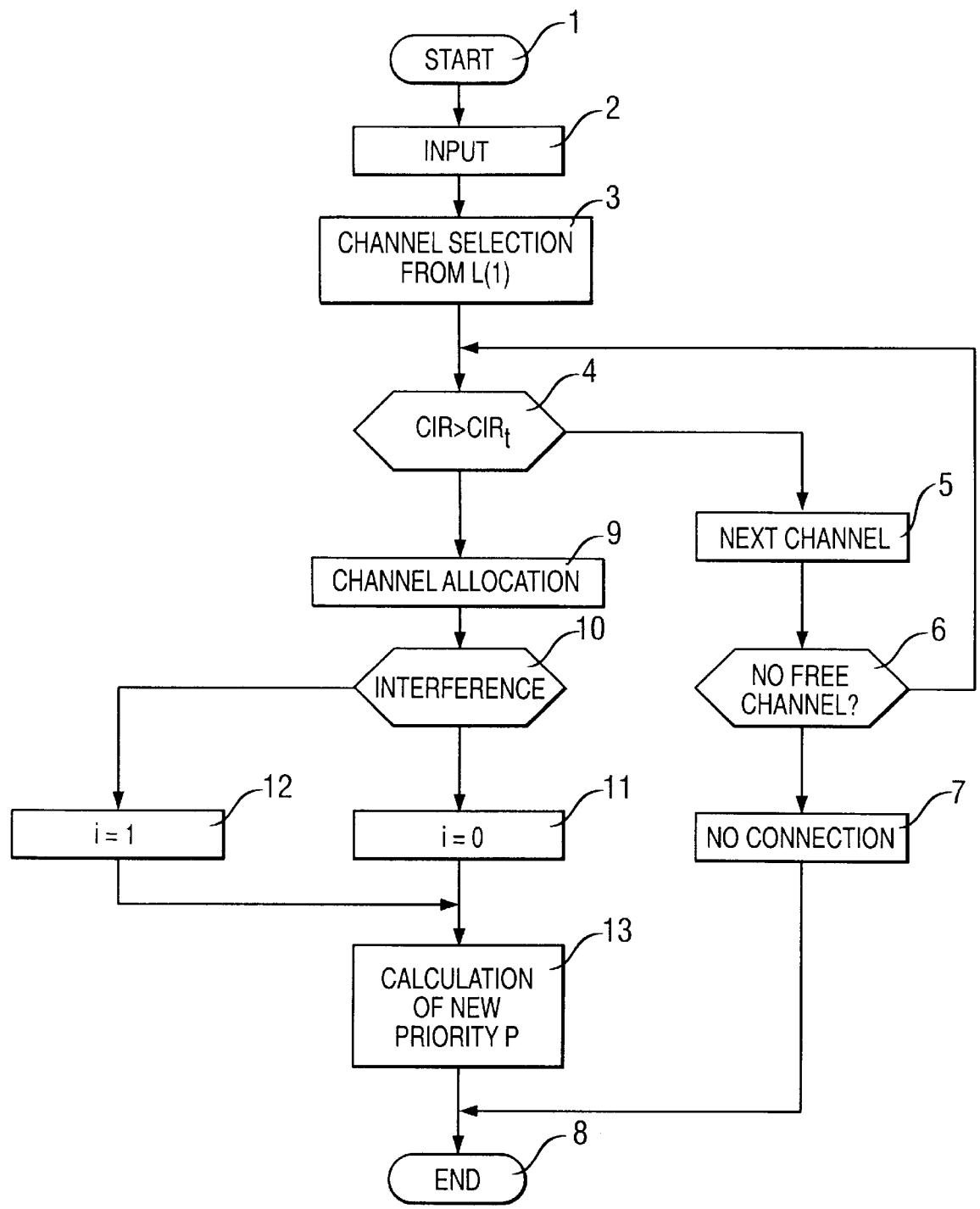
FIG. 1 is a flow chart illustrating the process according to this invention.

The program diagrammed in FIG. 1 is started at 1 each time a channel is needed. In the case of line-oriented connections, for example. this is necessary when establishing the connection or in a hand-over from another cell. In package-oriented transmission, a free channel is occupied with each segment of the connection.

An integer 1 representing an ordinal number of the priority list to be used in a given case, is entered into the program at 2. Integer 1 can be entered manually. However, automatic selection of the priority list can also be performed within the scope of the invention, depending on the prevailing interference situation or load situation, or both.

In the following program part 3, the free channel with the highest priority P is selected from the selected priority list L(1). A decision is made at 4 whether or not the channel selected at 3 can be used. The decision is made as a function of whether the carrier/interference ratio CIR is larger than a threshold value CIRt, which is in turn composed of a minimal carrier/interference ratio CIRmin and a safety margin CIRs.

In the embodiment illustrated here, the safety margin CIRs is a function of the priority P of the channel selected. The carrier/interference ratio CIR can be determined for the process according to this invention during signaling performed before the start of the connection. However, it is also possible to use values that have been determined for the respective channel by measurements in the preceding connections or segments of connections and then stored.

The dependence of the safety margin CIRs on the priority may be given preferably by the function CIRs=C−f(P), where P may assume values between 0 and 1 and f(P−1)=0. Thus, channels of a high priority are used with a relatively low safety margin CIRS, while channels with a low priority must overcome a much higher safety margin. The function f(P) may be a logarithmic function, such as $f(P)=\log_{10}(P)$.

If the carrier/interference ratio CIR is not greater than the threshold value, branch 4 is followed by a program part 5 with which the next channel is selected from the priority list L(1). However, if it is found that no more channels are free, a branch 6 concerning whether the program was started on the basis of a new request for a connection or a hand-over is followed at 7 by a message that no connection is possible at the present time. In the case of package-oriented connections, the data to be transmitted are stored temporarily in an essentially known manner. Then the program is ended at 8.

However, if a channel with a sufficiently large carrier/interference ratio is available at branch 4, this channel is occupied at 9. At the end of the connection or at the end of the individual segments of the connection, it is determined at 10 whether the requirements stipulated for the quality of the connection or the segment of the connection are met. This can be evaluated on the basis of the measured carrier/interference ratio, for example. In the event the requirements are not met, a binary quantity i=0 is set at 11, whereas if the connection is undisturbed, i=1 is set at 12. Using the respective value of i, a new priority is calculated at 13, whereupon the program is ended at 8.

The selection of 1 can be made by manual input or by automatic determination of the interference situation and/or the load situation. Thus, for example, when there is a normal volume of communications traffic during the peak time of the day, a priority list L(1) can be used, whereas for special events, such as the end of an event after which there is increased demand for communications, a priority list L(2) is used. To obtain a priority list adapted to the prevailing situation, program part 13 can act on this list while the corresponding situation is in existence. To do so, program part 13 can be controlled with the quantity 1 accordingly. However, it is also possible, when there are special situations that might not be repeated, not to save the revised list obtained by calculating new priorities at 13.

For example, the frequency of requests for conversations or the frequency of the branching after "N" at 4 can be used for automatic determination of the respective interference situation or load situation, or both.

Figure 2:
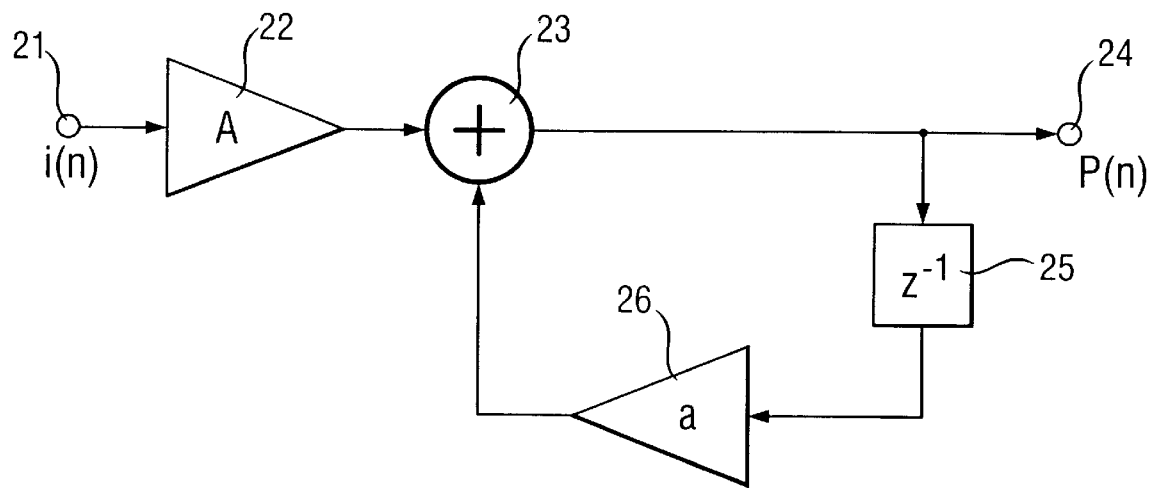
FIG. 2 is a schematic diagram of a first-order recursive filter.

FIG. 2 shows in schematic form a recursive filter of the first order. Input signal i(n) is sent to input 21, where n is a counting variable for designation of the successive values. At 22, i(n) is weighted with a factor A and sent over adder 23 to output 24 at which the priority P(n) is available. This is returned to adder 23 via temporary storage 25 and weighting 26 by a factor "a". In order for the priority values P(n) to remain within the range between 0 and 1, A=1−a is set. It is unnecessary to explain additional details of a recursive filter in conjunction with the present invention because recursive filters have been described adequately in the literature. It is pointed out only that as "a"becomes larger, the cut-off frequency of the low-pass filter is lower and the integration time is longer, and the influence of previous interference data on the instantaneous priorities P(n) is also greater accordingly. For stability reasons, however, the value of "a"is less than 1.

Figure 3:
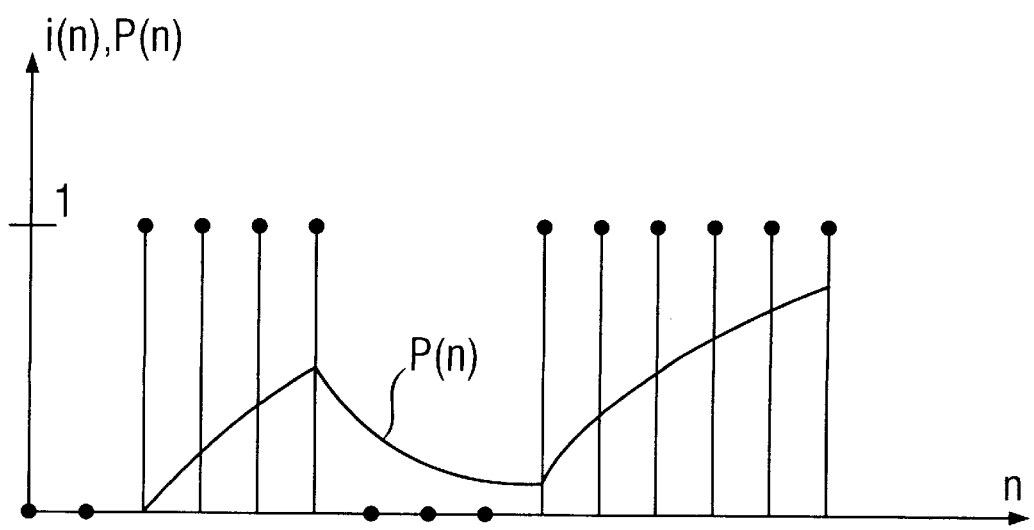
FIG. 3 is a chart of the input and output parameters of the recursive filter of FIG. 2.

FIG. 3 shows the chart for the priority P(n) as the output quantity of the recursive filter at the input quantity i(n) varies between the values 0 and 1.

In view of the above discussion it is likely that modifications and improvements will occur to those skilled in the art, which are within the spirit and scope of the appended claims.

I claim:

1. A process for dynamic channel allocation in mobile radio networks, said process comprising the steps of:

establishing priorities for a plurality of individual channels;

increasing or decreasing the priorities as a function of interference occurring in each respective channel, where channels with a low priority are preferably occupied relative to channels with a high priority when there are good propagation conditions; and taking into account a threshold value (CIRt), in particular the carrier/interference ratio (CIR), which is used in testing whether or not a channel is to be occupied; wherein the threshold value (CIRt) is a function of the priority (P) of the respective channel, where said function starts from a constant value and follows a course that decreases monotonically as the priority (P) becomes lower.

2. The process according to claim 1, wherein the declining course is logarithmic.

3. A process for dynamic channel allocation in mobile radio networks, said process comprising the steps of:

establishing priorities for a plurality of individual channels;

increasing or decreasing the priorities as a function of interference occurring in each respective channel, where channels with a lower priority are preferably occupied relative to channels with a high priority when there are good propagation conditions; and taking into account a threshold value (CIRt), in particular the carrier/interference ratio (CIR), which is used in testing whether or not a channel is to be occupied; wherein the threshold value (CIRt) is a function of the priority (P) of the respective channel, where said function starts from a constant value and follows a course that decreases monotonically as the priority (P) becomes lower; and wherein a quantity that depends on an extent of the interference is averaged to increase or decrease the priority.

4. The process according to claim 3, wherein the averaging is performed by recursive filtering.

5. A process for dynamic channel allocation in mobile radio networks, said process comprising the steps of:

establishing priorities for a plurality of individual channels;

increasing or decreasing the priorities as a function of interference occurring in each respective channel, where channels with a low priority are preferably occupied relative to channels with a high priority when there are good propagation conditions; and taking into account a threshold value (CIRt), in particular the carrier/interference ratio (CIR), which is used in testing whether or not a channel is to be occupied; wherein the threshold value (CIRt) is a function of the priority (P) of the respective channel, where said function is a substantially continuous function which starts from a constant value and follows a course that decreases monotonically as the priority (P) becomes lower.

* * * * *